US007254754B2

(12) United States Patent
Hetzler et al.

(10) Patent No.: US 7,254,754 B2
(45) Date of Patent: Aug. 7, 2007

(54) RAID 3+3

(75) Inventors: Steven Robert Hetzler, Los Altos, CA (US); Daniel Felix Smith, San Jose, CA (US); Shmuel Winograd, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/619,648

(22) Filed: Jul. 14, 2003

(65) Prior Publication Data

US 2005/0015700 A1  Jan. 20, 2005

(51) Int. Cl.
*G11C 29/00* (2006.01)

(52) U.S. Cl. .................... 714/710; 714/800; 714/6
(58) Field of Classification Search ............ 714/6, 714/710, 800
See application file for complete search history.

(56) References Cited

U.S. PATENT DOCUMENTS

| 5,128,944 A | * | 7/1992  | Flaherty et al. ............ 714/6 |
| 5,134,619 A |   | 7/1992  | Henson et al. |
| 5,148,432 A |   | 9/1992  | Gordon et al. |
| 5,204,836 A | * | 4/1993  | Reed ...................... 365/200 |
| 5,257,391 A |   | 10/1993 | DuLac et al. |
| 5,301,297 A |   | 4/1994  | Menon et al. |
| 5,379,417 A | * | 1/1995  | Lui et al. .................. 713/300 |
| 5,398,253 A |   | 3/1995  | Gordon |
| 5,506,977 A |   | 4/1996  | Jones |
| 5,579,475 A |   | 11/1996 | Blaum et al. |
| 5,793,683 A | * | 8/1998  | Evans .................... 365/200 |
| 5,835,938 A |   | 11/1998 | Yamamoto et al. |
| 5,848,229 A |   | 12/1998 | Morita |
| 5,867,433 A | * | 2/1999  | Shen et al. ............... 365/200 |
| 5,937,428 A |   | 8/1999  | Jantz |
| 6,070,249 A | * | 5/2000  | Lee ......................... 714/6 |
| 6,138,125 A |   | 10/2000 | DeMoss |
| 6,154,853 A |   | 11/2000 | Kedem |
| 6,161,165 A |   | 12/2000 | Solomon et al. |
| 6,269,453 B1 | * | 7/2001 | Krantz ..................... 714/6 |

(Continued)

OTHER PUBLICATIONS

G.A. Alvarez et al., Tolerating Multiple Failures in RAID Architectures with Optimal Storage and Uniform Declustering, Computer Architecture News (USA), V. 25, #2, pp. 62-72, May 1972.

(Continued)

*Primary Examiner*—Guy Lamarre
*Assistant Examiner*—Mujtaba K. Chaudry
(74) *Attorney, Agent, or Firm*—Joseph P. Curtin, L.L.C.

(57) ABSTRACT

A data storage subsystem that includes three data storage units, three check storage units, and an array controller coupled to the three data and three check storage units can tolerate failure of any three data and check storage units failures can be occur before data stored on the data storage subsystem is lost. Information is stored on the data storage subsystem as a symmetric Maximum Distance Separation code, such as a Winograd code, a Reed Solomon code, an EVENODD code or a derivative of an EVENODD code. The array controller determines the contents of the check storage units so that any three erasures of the data storage units and the check storage units can be corrected by the array controller. The array controller updates a block of data contained in any one of the data storage units and the check storage units using only six IO operations.

11 Claims, 2 Drawing Sheets

U.S. PATENT DOCUMENTS

| | | | |
|---|---|---|---|
| 6,275,898 B1* | 8/2001 | DeKoning | 711/114 |
| 6,279,138 B1 | 8/2001 | Jadav et al. | |
| 6,289,471 B1* | 9/2001 | Gordon | 714/6 |
| 6,353,895 B1 | 3/2002 | Stephenson | |
| 6,530,004 B1* | 3/2003 | King et al. | 711/165 |
| 2002/0035667 A1 | 3/2002 | Bruning, III et al. | |

OTHER PUBLICATIONS

V. Bohossian et al., Computing in the RAIN: A Reliable Array of Independent Nodes, pp. 1-20, Sep. 24, 1999.

P.M. Chen et al., RAID: High-Performance, Reliable Secondary Storage, ACM Computing Surveys, vol. 26, No. 2, pp. 146-185, Jun. 1994.

M. Holland et al., Parity Declustering for Continuous Operation in Redundant Disk Arrays, ACM 0-89791-535-6/92/0010/0023, pp. 23-35, Oct. 1992.

N.K. Ouchi, Two-Level DADS Failure Recovery Method, IBM Technical Disclosure Bulletin, vol. 36, No. 03, pp. 187-190, Mar. 1993.

D.A. Patterson et al., A Case for Redundant Arrays of Inexpensive Disks (RAID), ACM 0-89791-268-3/88/0006/0109 1998.

J.S. Plank, A Tutorial on Reed-Solomon Coding for Fault-Tolerance in RAID-like Systems, pp. 1-19, Feb. 19, 1999.

E.J. Schwabe et al., Evaluating Approximately Balanced Parity-Declustered Data Layouts for Disk Arrays, ACM 0-89791-813-4/96/05, pp. 41-54, 1996.

E.J. Schwabe et al., Flexible Usage of Parity Storage Space in Disk Arrays, ACM 0-89791-809-6/96/06, pp. 99-108, 1996.

L. Xu et al., X-Code: MDS Array Codes with Optimal Encoding, IEEE Trans. On Information Theory, vol. 45, No. 1, pp. 272-276, Jan. 1999.

M. Blaum et al., "MDS Array Codes with Independent Parity Symbols," IEEE Trans. on Information Theory, vol. IT-42, pp. 529 542, Mar. 1996.

M. Blaum et al., "The EVENODD Code and its Generalization," High Performance Mass Storage and Parallel I/O: Technologies and Application, edited by H. Jin et al., IEEE & Wiley Press, New York, Chapter 14, pp. 187 208, 2001.

M. Blaum et al., "EVENODD: An Efficient Scheme For Tolerating Double Disk Failures In A RAID Architecture," IEEE Trans. on Computers, vol. 44, No. 2, pp. 192-202, Feb. 1995.

* cited by examiner

RAID 3+3

CROSS-REFERENCE TO RELATED APPLICATIONS

The present application is related to patent application Ser. No. 10/619,641, entitled "Anamorphic Codes", patent application Ser. No. 10/619,633, entitled "Autonomic Parity Exchange," and patent application Ser. No. 10/619,648, entitled "Multi-path Data Retrieval From Redundant Array" each co-pending, co-assigned and filed concurrently herewith, and each incorporated by reference herein. The present application is also related to co-pending and co-assigned patent application Ser. No. 10/600,593, which is also incorporated by reference herein.

BACKGROUND OF THE INVENTION

1. Field of the Invention

The present invention relates to storage systems. In particular, the present invention relates to a system and a method for providing improved performance, protection and efficiency for an array of storage units.

2. Description of the Related Art

The following definitions are used herein and are offered for purposes of illustration and not limitation:

An "element" is a block of data on a storage unit.

A "base array" is a set of elements that comprise an array unit for an Error or Erasure Correcting Code.

An "array" is a set of storage units that holds one or more base arrays.

A "stripe" is a base array within an array.

n is the number of data units in the base array.

r is the number of redundant units in the base array.

m is the number of storage units in the array.

d is the minimum Hamming distance of the array.

D is the minimum Hamming distance of the storage system.

IOw is the number of IOs to perform an update write.

The total number of storage units in an array is m=n+r.

Storage systems have typically relied on RAID techniques for protecting against data loss caused by storage unit failures. Current RAID designs, however, are reaching the limits of their usefulness based on increasing storage unit capacities. The notation (X+Y) used herein will be used to indicate X data units and Y redundant units. Most systems today use RAID 5 (n+1) or single mirroring (1+1) as a basic array design. Both of these types of storage system configurations have a minimum Hamming distance of D=2 and, therefore, protect against a single storage unit failure. As used herein, the term "distance" refers to the minimum Hamming distance. The likelihood of multiple drive failures and hard errors, however, have increased the occurrence of data loss events in RAID 5 system configurations. Multiple storage unit losses leading to data loss have been observed in practice.

Many array configurations have been proposed for handling such a high failure rate. For example, RAID 6 (n+2) having a distance D=3, double mirroring (1+2) having a distance D=3, and RAID 51 (n+(n+2)) having a distance D=4 have all been proposed as solutions for handing a high failure rate. Nevertheless, all of these array configurations have shortcomings as will be described in connection with Table 1 and FIG. 2.

What is still needed is an array configuration that provides improved performance, protection and efficiency over conventional approaches.

BRIEF SUMMARY OF THE INVENTION

The present invention provides an array configuration that provides improved performance, protection and efficiency over conventional approaches.

The advantages of the present invention are provided by an array controller coupled to three data storage units and three check storage units: a (3+3) configuration, referred to herein as a RAID 3+3 array. Information is stored on the data storage subsystem as a symmetric Maximum Distance Separation code, such as a Winograd code, an EVENODD or a derivative of an EVENODD code, or a Reed Solomon code. The array controller determines the contents of the check storage units so that any three erasures from the data and check storage units can be corrected by the array controller. Failure of any three storage units, data and check, can occur before data stored in the data storage subsystem is lost. The array controller updates a block of data contained in array using only six IO operations while maintaining the contents of the check storage units so that any three erasures of the data storage units and the check storage units can be corrected by the array controller. Two of the IO operations are read operations and four of the IO operations are write operations. More specifically, the read operations read data from the data storage units that are not being updated, and the four write operations write data to the data storage unit being updated and to the three check storage units.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a new storage system configuration that has significant advantages over previously conventional storage system configurations. In that regard, the storage system configuration of the present invention provides the best combination of performance, protection and efficiency. The storage system configuration of the present invention also enables entirely new techniques for handling errors that increase the level of protection. See, for example, patent application Ser. No. 10/619,641, entitled "Anamorphic Codes", patent application Ser. No. 10/619,633, entitled "Autonomic Parity Exchange," and patent application Ser. No. 10/619,648, entitled "Multi-path Data Retrieval From Redundant Array", and each incorporated by reference herein.

Figure 1:
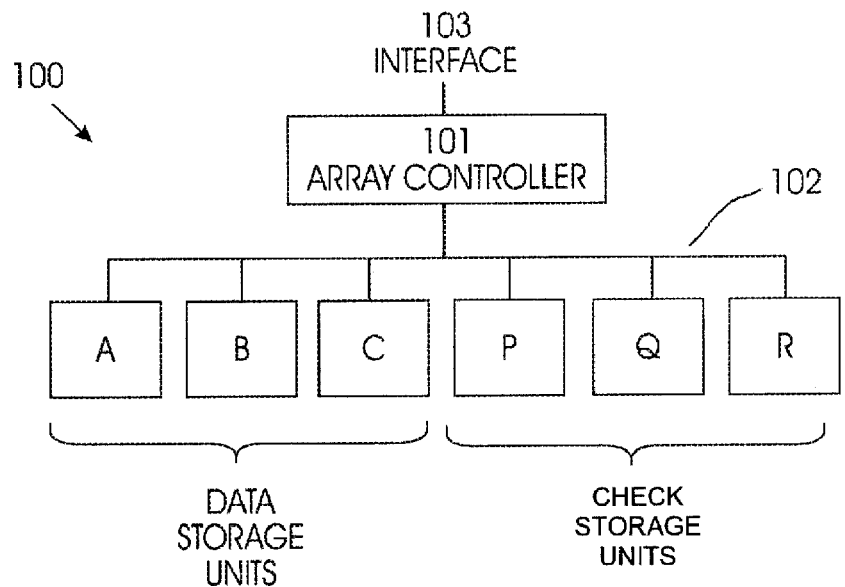
FIG. 1 shows a RAID 3+3 storage subsystem according to the present invention.

FIG. 1 shows a RAID 3+3 storage subsystem 100 according to the present invention. Subsystem 100 includes an array controller 101, three data storage units A, B and C containing data and three check storage units P, Q and R containing redundant information. Data storage units A, B and C and check storage units P, Q and R typically are Hard Disk Drives (HDDs), but will be referred to herein as storage units because the present invention is applicable to storage systems formed from arrays of other memory devices, such as Random Access Memory (RAM) storage devices, optical storage device, and tape storage devices. Storage units A, B, C, P, Q and R communicate with array controller 101 over interface 102. Array controller 101 communicates to other controllers and host systems (not shown) over interface 103. Such a configuration allows array controller 101 to communicate with multiple storage arrays.

The configuration of storage subsystem 100 is referred to as a symmetric code in which the number of data storage units is the same as the number of redundant storage units, and is MDS. Array controller 101 calculates redundant information from the contents of the data units such that all the data can be recovered from any three of the six storage units.

There are several ways of calculating the redundant data. The preferred method is to use a Winograd code. Winograd codes are highly efficient encodings that only utilize exclusive-OR (XOR) operations for computing the redundant data. There are highly efficient Winograd codes for computing a 3+3 code, (as illustrated in patent application Ser. No. 10/600,593, which is incorporated by reference herein. There are also extensions to the EVENODD code that only utilize XOR operations, however they are less efficient than the Winograd codes. See, for example, M. Blaum et al., "EVENODD: An Efficient Scheme For Tolerating Double Disk Failures In A RAID Architecture," IEEE Trans. on Computers, Vol. 44, No. 2, pp. 192-202, February 1995, and M. Blaum et al., "The EVENODD Code and its Generalization," High Performance Mass Storage and Parallel I/O: Technologies and Applications,' edited by H. Jin et al., IEEE & Wiley Press, N.Y., Chapter 14, pp. 187-208, 2001.

The data efficiency of RAID 3+3 storage subsystem 100 is ½. The configuration of RAID 3+3 array 100 as a storage subsystem that is part of a larger storage system provides several advantages over conventional storage subsystems relating to failure resilience and write performance.

For example, RAID 3+3 subsystem 100 can tolerate failure of any three storage units without losing the data set. This is a property of a Maximum Distance Separation (MDS) erasure code; such as a Winograd code, an EVENODD or a derivative of an EVENODD code, or a Reed-Solomon code, that RAID 3+3 storage subsystem 100 uses. The resilience to failure permits repairs to be made to RAID 3+3 storage subsystem 100 in a less urgent fashion for conventional RAID system configurations. That is, by providing more redundancy, the opportunity to repair a broken subsystem is increased, thereby allowing a longer interval before data loss occurs due to storage unit failures. Additionally, by keeping the number of storage units within the subsystem low, the chances of units failing within each subsystem is reduced in comparison to subsystems that use a larger number of storage units.

An additional benefit occurs during the repair stage when having $D \geq 2$ (i.e., there is remaining redundancy) allows the recovery of further, perhaps small, data loss events by any unit that is being used during the repair process. Furthermore, when one or fewer storage units have failed, array controller 101 of RAID 3+3 subsystem 100 is able to repair data from any storage unit that returns incorrect data.

TABLE 1

| RAID Configuration | Distance | Storage Efficiency | Write Penalty |
|---|---|---|---|
| RAID 5 | 2 | 93.8% | 4 |
| Mirror | 2 | 50% | 2 |
| RAID 6 | 3 | 87.5% | 6 |
| RAID 2 + 2 | 3 | 50% | 4 |
| 2× Mirror | 3 | 33.3% | 3 |
| RAID n + 3 | 4 | 81.3% | 8 |
| RAID 3 + 3 | 4 | 50% | 6 |
| RAID 51 | 4 | 43.8% | 6 |
| 3× Mirror | 4 | 25% | 4 |

Table 1 compares the data storage efficiency and write performance penalty of different conventional system configurations and a RAID 3+3 system configuration according to the present invention. The first (leftmost) column lists a number of conventional system configurations, including a RAID 3+3 system configuration according to the present invention. The second column shows the minimum Hamming distance, the third column shows the data storage efficiency, and the fourth column shows the write performance penalty for the different system configurations listed in the first column to Table 1. The data storage efficiency value for each respective system configuration, ignoring spares, is computed assuming an array size of m=16 storage units. The write performance penalty values represent the number of IO operations for small block writes.

Figure 2:
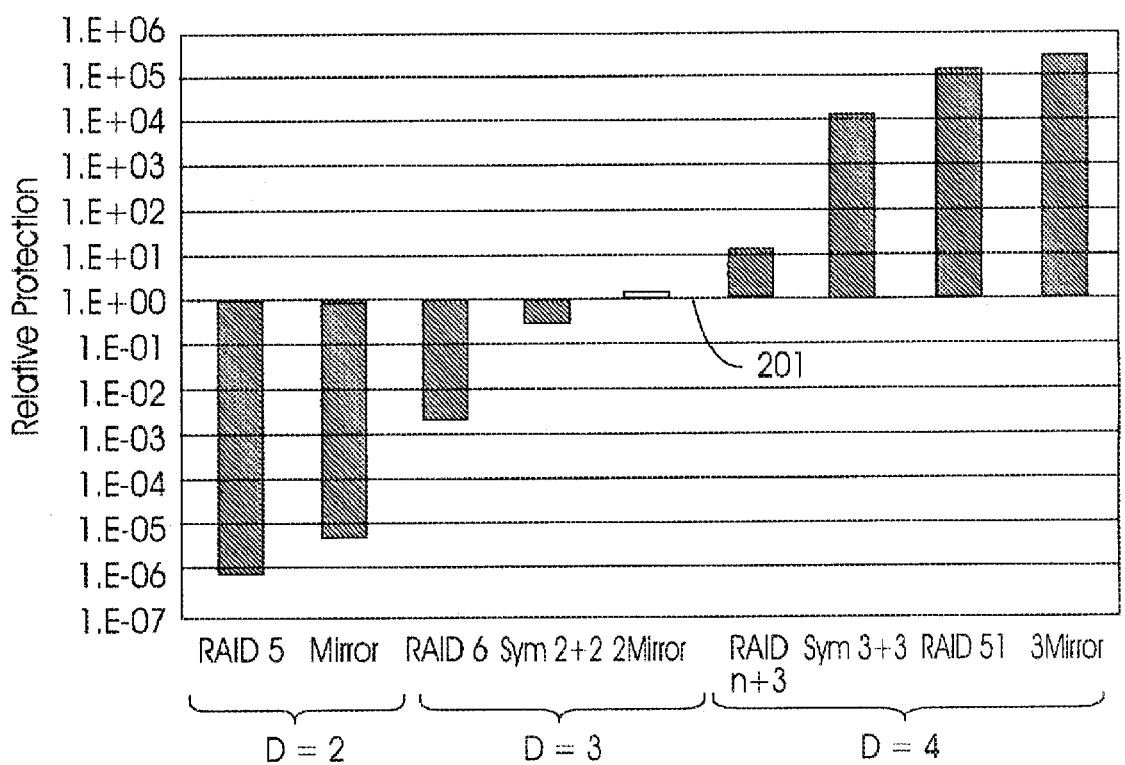
FIG. 2 is a graph comparing the relative protection of different conventional system configurations and a RAID 3+3 system configuration according to the present invention.

FIG. 2 is a graph comparing the relative protection over a period of time of the system configurations listed in Table 1. The abscissa lists the system configurations, including a RAID 3+3 system configuration according to the present invention. The bars indicate the relative protection level provided by each respective system configuration, as quantified by the right ordinate. In the example of FIG. 2, an array size of m=16 is assumed, and 250 GB storage units with a 1 Million hour MTBF and a hard error probability of 1 in $10^{14}$ bits transferred. Horizontal line 201 at a protection level of 1 indicates a selected protection target of 1 data loss event per million storage units per 5 years. Starting at the left side of FIG. 2, the protection levels provided by a RAID 5 system configuration and a Mirroring system configuration (both distance D=2 solutions) do not meet the selected protection target (line 201), revealing a need for a stronger solution than provided by either of these two system configurations. A RAID 6 (n+2) system configuration at distance D=3 has high efficiency, but falls far short of the reliability target. A Symmetric 2+2 system configuration and a 2× Mirror system configuration are both distance D=3 solutions that hover near the selected protection target (line 201). These two system configurations have similar levels of protection, but the 2× Mirror configuration design trades efficiency for performance. A RAID n+3 system configuration is a distance D=4 solution having high efficiency, but an acutely poor write performance with essentially the same level of protection as the distance D=3 solutions. Thus, there is a significant reliability tradeoff required for achieving high efficiency.

The three rightmost system configurations in FIG. 2 are all distance D=4, and all are significantly more reliable than the other six configurations. Of the three system configurations, a RAID 3+3 system configuration according to the present invention provides the highest efficiency of the three rightmost system configuration, and has the same write behavior as a RAID 51 system configuration. A 3×Mirror system design sacrifices substantial efficiency for improved the write performance. All of the D=4 system configurations shown in FIG. 2 have sufficient protection headroom to be sufficient for future generations (>4 orders of magnitude) of storage system.

A RAID 3+3 system configuration according to the present invention achieves a distance of D=4, while requiring only six IOs for small block writes.

A conventional updating technique is used for a linear MDS code to update parities based on changes in data. The conventional technique requires reading the old data from the data drive, reading the corresponding old parities from the parity drives, writing the new data, computing the new parities and writing the new parities to the parity drives. The conventional technique of updating parities based on changes in data will be referred to herein as the "forward method" of updating parities. Thus, the number of IOs to perform an update write for the forward method is:

$$IOw_{fwd} = \underbrace{(1+r)}_{\text{Read old data and parities}} + \underbrace{(1+r)}_{\text{Write new data and parities}} \quad (1)$$
$$= 2D$$

A second method that can be used for updating parity in an MDS code referred to herein as the "complementary method" of updating parities. In the complementary method, the existing data is first read from the data drives that are not being updated, then the new data and parity values are written. The number of IOs to perform an update write for the complementary update method is:

$$IOw_{comp} = \underbrace{(n-1)}_{\text{Read Complement data}} + \underbrace{(1+r)}_{\text{Write new data and parities}} \quad (2)$$
$$= n + r$$
$$= m$$

Thus, there are situations in which the complementary method is more efficient than the conventional forward method. When $$IOw_{comp} \leq IOw_{fwd}, \quad (3)$$

it follows that $$n+r \leq 2(r+1) \; n \leq r+2. \quad (4)$$

Equation 4 shows that array configurations having a high degree of redundancy thus have better IO efficiency by using the complementary method for updating parity. The complementary method also spreads the IO load more evenly among the storage units of the system because there is one IO per device—either a read or a write. Conversely, the forward method involves read-modify-write operations on the accessed devices resulting in a more localized access pattern. The complementary method may also have better implementation characteristics when, for example, nearby data is cached.

A symmetric code where n=r provides a further performance advantage when the complementary method is used for update writes. In a symmetric code, the Hamming distance is D=r+1. In the general MDS case, the number of IOs to perform an update was shown to be $IOw_{fwd}=2D$. For a symmetric code update using the complementary method, $$IOw_{Sym} = m \quad (5)$$
$$= n + r$$
$$= 2r$$
$$= 2D - 2.$$

Thus, two IOs are saved from the case of the general MDS codes using the forward update method. This means that a symmetric code can achieve a minimum distance that is 1 greater than a general MDS code at the same write performance.

Referring to FIG. 1, consider a situation of an update write to unit B. Using the complementary method, the associated old data is read from units A and C, then the new data is written to unit B, and the new check information is written to units P, Q and R. In contrast, the conventional forward method would entail reading the associated old data from units B, P, Q and R, then writing the new data to B and the new checks to P, Q and R. Thus, the complementary method uses six IOs, while the conventional forward method requires eight IOs.

Distance D=4 can also be achieved using a 3× mirror. This requires only four IOs for an update write, but has an efficiency of ¼. RAID 51 system designs and derivatives can achieve distance D=4 at six IOs with a combination of the forward method and a copy, but have efficiency <½.

Figure 3:
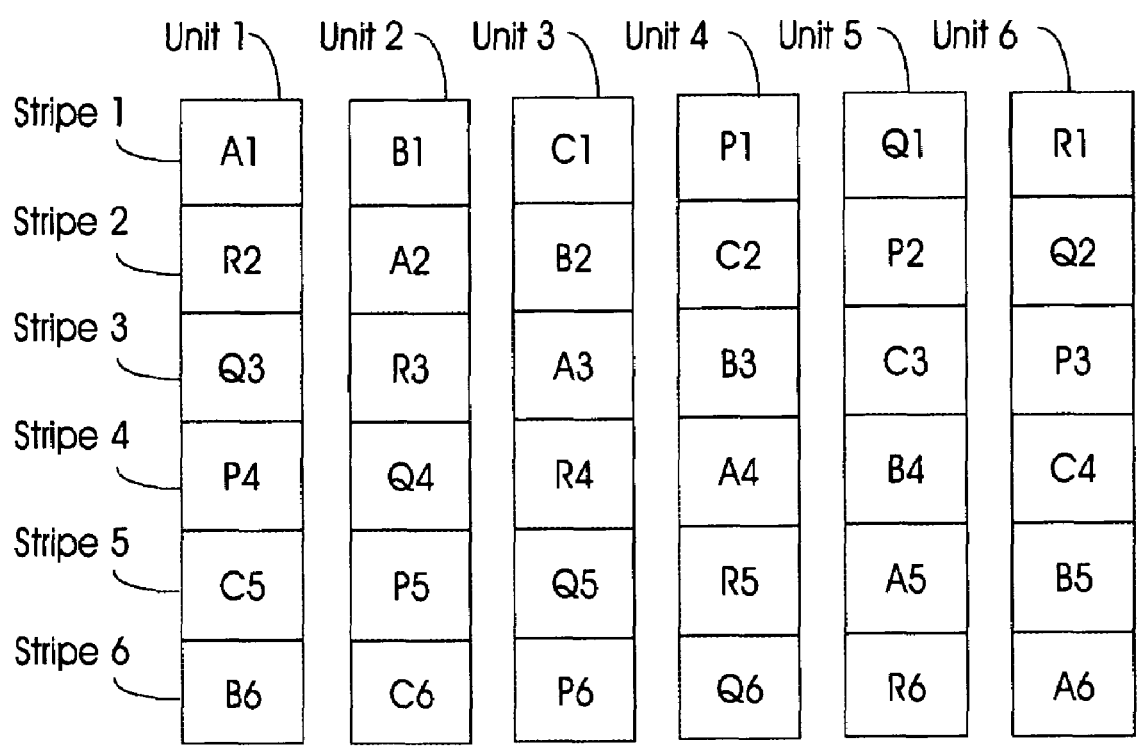
FIG. 3 shows a RAID 3+3 storage subsystem according the present invention in which the subsystem is configured as a plurality of stripes, each consisting of a RAID 3+3 base array, and in which the data and check elements are distributed among the storage units for minimizing access hot spots.

Distributed parity can be used with a RAID 3+3 system configuration according to the present invention for avoiding hot spots. Hot spots can occur when data access patterns are localized. RAID 5 uses distributed parity (also called declustered parity) to avoid hotspots induced by having a dedicated parity storage unit (known as RAID 4). RAID systems using the forward update method will have hot spots on the parity units due to the read-modify-write operations. While RAID systems using the complementary update method avoid this type of hot spot, write activity will concentrate on the check units. FIG. 3 illustrates one method for distributing parity across the storage units to achieve a balanced distribution of array elements. This involves striping the data across the set of storage units such that each storage unit has elements of all the (A, B, C, P, Q and R) types. Referring to FIG. 3, storage units 1-6 are shown as the columns, with stripes 1-6 as the rows. The elements are rotated 1 unit to the right for each successive stripe. Clearly, there are many other stripe configurations that can be utilized to avoid hot spots.

While the present invention has been described in terms of storage arrays formed from HDD storage units, the present invention is applicable to storage systems formed from arrays of other memory devices, such as Random Access Memory (RAM) storage devices, optical storage device, and tape storage devices. Additionally, it is suitable to virtualized storage systems, such as arrays built out of network-attached storage. It is further applicable to any redundant system in which there is some state information that associates a redundant component to particular subset of components, and that state information may be transferred using a donation operation.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A data storage subsystem, comprising:
   three data storage units;
   three check storage units; and
   an array controller coupled to the three data storage units and the three check storage units, the array controller determining the contents of the check storage units so that any three erasures of the data storage units and the check storage units can be corrected by the array controller, the array controller updating a block of data contained in any one of the data storage units and the check storage units using only six IO operations while determining the contents of the check storage units so that any three erasures of the data storage units and the check storage units can be corrected by the array controller.

2. The data storage subsystem according to claim 1, wherein information is stored on the data storage subsystem as a symmetric Maximum Distance Separation code.

3. The data storage subsystem according to claim 2, wherein the Maximum Distance Separation code comprises a Winograd code.

4. The data storage subsystem according to claim 2, wherein the Maximum Distance Separation code comprises a Reed-Solomon code.

5. The data storage subsystem according to claim 2, wherein the Maximum Distance Separation code comprises an EVENODD code.

6. The data storage subsystem according to claim 2, wherein the Maximum Distance Separation code comprises a derivative of an EVENODD code.

7. The data storage subsystem according to claim 1, wherein two of the IO operations are read operations and four of the IO operations are write operations.

8. The data storage subsystem according to claim 1, wherein the read operations read data from the data storage units that are not being updated, and the four write operations write data to the data storage unit being updated and to the three check storage units.

9. The data storage subsystem according to claim 1, wherein failure of any three data storage units and check storage units can occur before data stored on the data storage subsystem is lost.

10. The data storage subsystem according to claim 1, wherein data is recoverable from a partially readable storage unit.

11. The data storage subsystem according to claim 1, wherein the array controller can recover any data stored on the data storage subsystem when all three data storage units have failed.

* * * * *